July 7, 1970　　　S. R. SCRUBY ET AL　　　3,519,094

MEASURING DEVICE

Filed July 15, 1968　　　　　　　　　　　　　　4 Sheets-Sheet 1

Fig. 1

Stanley R. Scruby
John E. House, Jr.
INVENTORS

BY

ATTORNEY

Fig. 2

United States Patent Office 3,519,094
Patented July 7, 1970

3,519,094
MEASURING DEVICE
Stanley R. Scruby and John E. House, Jr., Houston, Tex., assignors to Semco Electrical Controls, Inc., Houston, Tex., a corporation of Texas
Continuation-in-part of application Ser. No. 539,045, Mar. 31, 1966. This application July 15, 1968, Ser. No. 747,028
Int. Cl. G01g 19/22
U.S. Cl. 177—1   28 Claims

ABSTRACT OF THE DISCLOSURE

A measuring system for weighing multiple ingredients in a batch, including a scale having a pointer or indicator arm, a sensor which follows the scale movement, and a motor driving a sensor and pulse generator at the same time, causing pulses to be generated proportional to the scale movement, a pulse counter for each ingredient to be weighed, means for comparing the pulses counted with a preset amount of each ingredient and for stopping the flow of the ingredients to the scale upon reaching said preset amount, a reversing relay to return the sensor to below scale zero, and then to bring the sensor back to scale zero after the ingredients are dumped from the scale, means for dumping the ingredients from the scale and returning the indicator arm to scale zero, and a stepping switch to prevent the counting of pulses when the sensor moves up to scale zero to compensate for a tare weight on the scale.

CROSS REFERENCES TO RELATED APPLICATIONS

This application is a continuation-in-part of abandoned application Ser. No. 539,045, filed Mar. 31, 1966.

BACKGROUND OF THE INVENTION

Field of the invention

This invention relates to measuring apparatus, and more particularly it relates to apparatus for weighing batches of one or more ingredients and for accurately determining the amount of each ingredient, and the invention further relates to means for automatically starting and stopping the flow of such ingredients to a scale platform.

In many industries it is necessary to accurately weigh the amounts of flowable materials delivered to a given location. In many cases several different ingredients are delivered in a single batch. It is highly desirable in such situations that the total batch weight and the proportion of each ingredient in the batch be closely controlled. Often a number of such batches are weighed in separate containers, and the containers are not all the same weight, so that there is a different tare weight on the scale for each batch that is weighed. Where the batches are weighed in a hopper on the scale, some materials often heel up in the container in varying amounts so that the tare weight of this container is not always the same for the sequential batches.

Description of the prior art

Many different automatic weighing systems are known which are provided with devices for producing an electrical signal proportional to the weight of material weighed by a scale. Such signals are usually compared with a preset amount to determine when the desired amount of material has been delivered to the scale platform. When the amount indicated by the signal equals the preset amount, the flow of material to the scale platform is cut off.

Similar systems are also known for measuring various materials by volume and may be used for measuring either liquids or other fluid materials such as pulverulent solids of various kinds.

Such prior art systems have had several disadvantages, however. A major disadvantage has been the aforesaid variation in tare weight, which requires a resetting of the zero point in the system for every batch that is weighed. Another problem has arisen as a result of what is known as inertial effects. Such inertial effects are due to the friction of support pins, cells or pivots that support a scale platfrom and other elements within the scale and due to the kinetic energy of the materials falling onto the scale platform. Thus, when a small amount of product is fed onto a scale platform the scale mechanism usually does not move at first. After some additional amount has fallen, enough weight is reached to cause the scale to surge ahead, even going beyond the actual weigh then on the platform and oscillating about the actual weight. This continues, in any weighing system, in very small increments throughout the weighing cycle. Heretofore previous systems have had to accept such surging as error and provide elaborate controls to read out accurately what the scale weighs, and the final weigh could be either over or under the desired weight.

The foregoing problem exists with such systems as that shown in U.S. Pat. 3,133,604 to Gardner. In an effort to compensate for this and other difficulties, Gardner provides for a pulsating flow of material to the scale platform, thereby reducing the speed of the system. Even with this he still can err either above or below the desired weight.

SUMMARY OF THE INVENTION

According to the present invention a method, apparatus and system are provided which greatly improve the accuracy of measurement of quantities of materials. The system of the present invention is capable of measuring a plurality of feed materials into a single container without dumping the materials from the container between successive feed materials, and is capable of giving an accurate measurement of the quantity of each material placed in the container and maintaining the materials in accurate proportion to each other. Furthermore, the system is capable of highly accurate duplication of the amounts of successive batches of materials. According to a preferred embodiment of the invention means are provided for presetting the precise amount of each material to be measured and for automatically feeding and measuring the materials to be mixed together while maintaining the amounts and proportions of the different materials in much greater accuracy than has heretofore been possible.

It is therefore an object of this invention to provide a measuring device, particularly for measuring weights of successive feed materials, in which all possible error of measurement are greatly reduced.

Another object of the invention is to provide a weight-measuring system in which variations in the tare weight on the scale platform are automatically dealt with and do not affect accurate measurement of materials fed onto the scale platform.

Still another object of the invention is to provide a measuring system which measures the angular displacement of a scale pointer to accurately determined the actual weight on the scale.

A further object of the invention is to provide a measuring system in which all measuring inaccuracies are on the plus side and are never on the minus side.

Another object of the invetnion is to provide a measuring system in which error due to inertial effects is substantially eliminated.

In a preferred embodiment of the invention the measuring system is one designed for obtaining measurements of weight and is particularly designed for measuring successive batches of multiple ingredients. In a preferred application of the invention a scale having a pointer or indicator arm is provided, the pointer being moved to indicate various weights on a dial when material is put on the scale. A sensor follows the indicator arm and signals are generated proportional to the movement of the sensor. The sensor moves faster than the indicator arm and is stopped every time it catches up. The signals generated are compared to a preset desired weight, and when these coincide, flow of material to the scale is cut off so that the amount of material delivered can never be less than the preset number. When more than one material is to be weighed in a batch, the foregoing operation is repeated for each material. Then when the batch is complete the sensor returns to a point below zero, the scale is dumped, and the scale returns to scale zero. "Scale zero" indicates the condition of the scale when no material is on it, and in practice is not a fixed point, but may vary over a "zero range," due to heeling up of material in a container on the scale, or to differences in container weights. This makes a change in tare weight between batches. When the scale has returned to scale zero, the sensor moves up to match it. Signals generated during this movement are not counted, but are locked out from the counter. The system is now in condition for weighing another batch.

DESCRIPTION OF THE PREFERRED EMBODIMENTS

Figure 1:
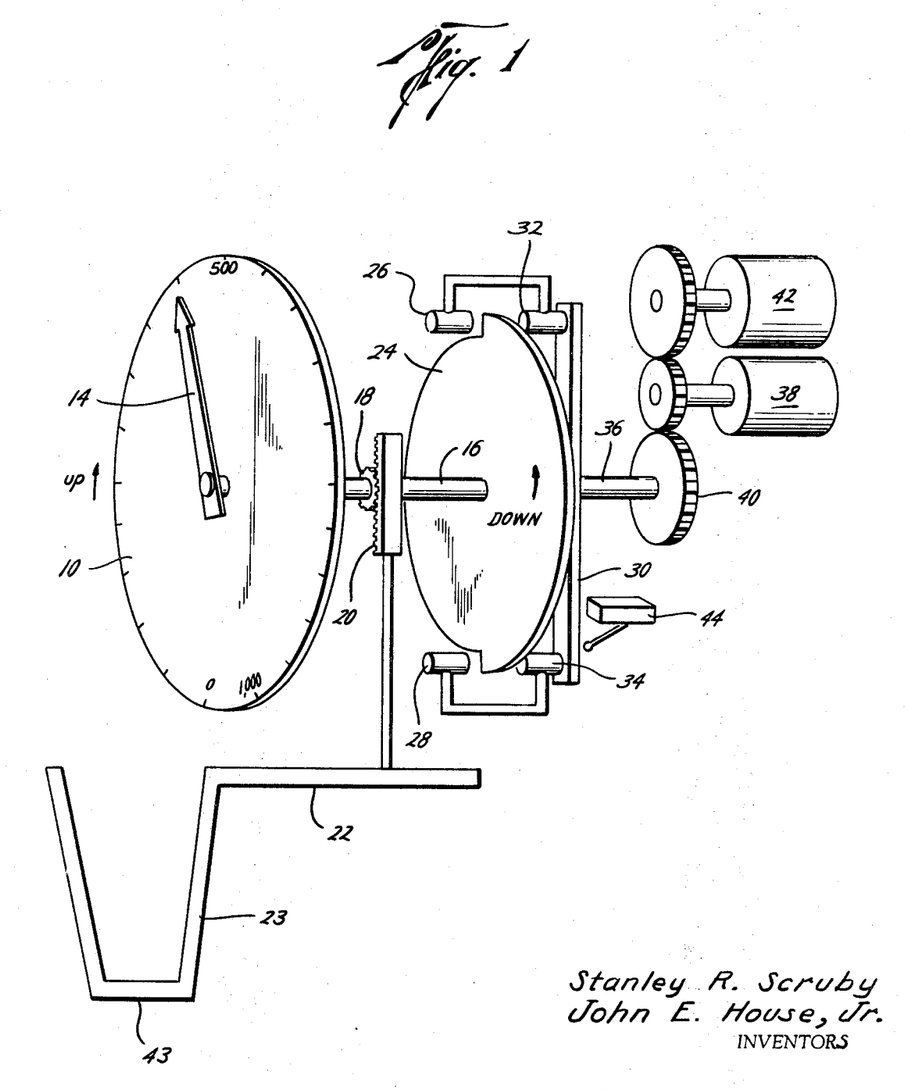
FIG. 1 is a somewhat schematic perspective view of the mechanical apparatus of one embodiment of this invention.

In FIG. 1 a conventional scale dial 10 is shown, the scale dial being mounted in a manner well known in the art and having an indicator arm or pointer 14 to provide a visual representation of the weight being measured on the scale platform 22. The pointer 14 is mounted on a shaft 16 which extends through the dial. The shaft 16 is connected, as is well known in the art, by means of a rack 20 and a pinion 18 to the scale platform 22. The scale platform may, for example, include a hopper 23. As is well known in the art, counterbalance weights or springs are used to operate the scale. A variety of such scale heads are known, such as those made by the Toledo Scale Company, which are satisfactory for use in the system of this invention. The invention does not reside in any details of the scale head itself and therefore a detailed description of this element is not believed to be necessary.

The shaft 16 is extended rearwardly from the dial 10 and has mounted thereon a shadow disk 24 which rotates with the shaft. The shadow disk 24 is a generally circular member but has a sector which is usually slightly less than 180 degrees, for example, 175 degrees, which is of larger radius than the remainder of the disk. There are then positioned two light-sensitive, silicon controlled rectifiers, which are loacted, for example, about 180° apart near the edge of the shadow disk 24 so that they will be hidden behind the larger radius sector of the shadow disk, but will not be hidden behind the smaller radius sector of the shadow disk. Each sensor is mounted on one end of a rotatable follower arm 30 which also has mounted thereon light sources 32 and 34 at its ends, each light source being positioned so that it is directly opposite one of the sensors 26 and 28. The follower arm 30 is mounted on a shaft 36 for rotation therewith. Shaft 36 is driven by a motor 38 through a gear-train 40.

The motor 38 is preferably an AC motor provided with a clutch and brake, as, for example, a Hurst PC–DA motor equipped with a positive clutch, in which the output shaft is started and stopped instantly, that is, without any coasting or acceleration, upon receipt of a start or stop signal. The motor is connected so that it runs continuously, either forward or reverse, during the up or down phase of the cycle, and operation of the output shaft is attained by energization and deenergization of the clutch and brake. Other drivers having substantially instantaneous start and stop, as for example a pulse motor, may also be used. As used herein, the term "power source" defines a drive system having substantially instant start and stop capability.

The motor speed and gear ratio are selected to move the follower arm somewhat faster than the material flow to the scale platform causes the pointer to move, and a speed ratio of about 1.3 to 1 has been found suitable.

One of the sensors 26 and 28 is connected through a reversing relay 76 (to be hereinafter described) in such a way that upon energization of the device the relay will connect the motor for rotation of the follower arm 30 clockwise, whereas upon energization of the other light-sensitive device the relay will be operated so as to cause the motor to rotate the follower arm counterclockwise. Then, the shining of one of the lights 32 or 34 on the corresponding sensor energizes the motor clutch so as to start rotation of the shaft 36. Thus, when material is being loaded onto the scale platform, pointer 14 and the shadow disk 24 will rotate clockwise, as seen in FIG. 1, or in the "up" direction, so as to allow light from light source 32 to impinge upon the sensor 26. The motor will be operated in a direction to cause the follower arm to rotate clockwise as seen in FIG. 1, so as to tend to catch up with the large radius sector of the shadow disk. So long as sensor 26 does not catch up with the large radius sector, the device is receiving light and is thereby sensitized so as to cause the shaft 36 to continue to rotate. However, if the sensor 26 catches up with the large radius sector of the shadow disk it will be hidden from the light 32, and the cessation of the signal from the sensor will cause the relay to disconnect the clutch so that the shaft 36 stops turning. If material is still being fed onto the scale platform, the large radius sector of the shadow disk will again move from between the light 32 and sensor 26 so that the clutch will be engaged again.

At the same time that the motor 38 is turning the follower arm 30 it is also driving a pulse generator 42, which generates pulses in proportion to the movement of the follower arm. The pulses are fed to a counting device upon which may be read a precise count indicative of the weight of material on the scale platform at any particular time. The connection of such a counting device will be referred to hereinafter. The pulse generator is a bidirectional rotary transducer suitable for converting rotary motion into digital pulses, and may for example be of the type sold under the trademark "Phototac," which is described on page 393 of Allied Catalog #660 of 1965.

When a desired amount of material has been fed to the scale platform or hopper 23 the material may be dumped out of the hopper by opening the bottom door 43, thereby causing the scale pointer 14 to return to zero. It is apparent that if the scale pointer returns to zero the shadow disk 24 will rotate in a counterclockwise or down direction so that the large sector portion of the shadow disk hides the sensor 26 from the light 32. However, it will at the same time move from between light 34 and light sensitive device 28 so as to energize the device 28. A signal to the relay 76 connects the sensor 28 and reverses the motor so as to cause the motor to drive the follower arm in a counterclockwise or down direction and thereby tend to cause the light 34 and sensor 28 to catch up with the enlarged radius sector of the shadow disk. When the scale pointer reaches zero, the movement of the shadow disk will stop. However, since the enlarged radius sector of the shadow disk is somewhat less than 180 degrees, the follower arm will travel past zero a few degrees before it can become hidden behind this enlarged radius sector. Just prior to the point at which it would stop moving in a down direction, the follower arm engages a microswitch 44, which sends a signal to the directional relay 76 to deenergize sensor 28 and to energize sensor 26, and also to reverse the direction of motor 38 and start it to operating to rotate the follower arm in the up direction. The arm will then move in the up direction until the sensor 26 becomes hidden behind the enlarged radius sector of the shadow disk, at which point the follower arm will stop. The assembly is, at this point, at home position so that the process may be repeated with additional material being fed to the scale platform.

The preceding discussion has been principally in terms of the mechanical operation of the apparatus of this invention and has been described as though only a single material were being weighed. Certain electrical elements of the apparatus are not described except functionally and it is not believed that any such description is necessary since such elements are well known in the art and may be readily adapted by those skilled in the art to apparatus as herein shown and described.

As has previously been stated, however, the apparatus of this invention achieves many additional benefits by its adaptation to the measurement of two or more ingredients. Furthermore, it is particularly adapted to automatic operation of a measuring system so that batches of several ingredients may each be automatically measured out and furthermore so that continuously repeating batches may be prepared, each of which is substantially identical to the others in proportion of ingredients and in total weight.

Figure 2:
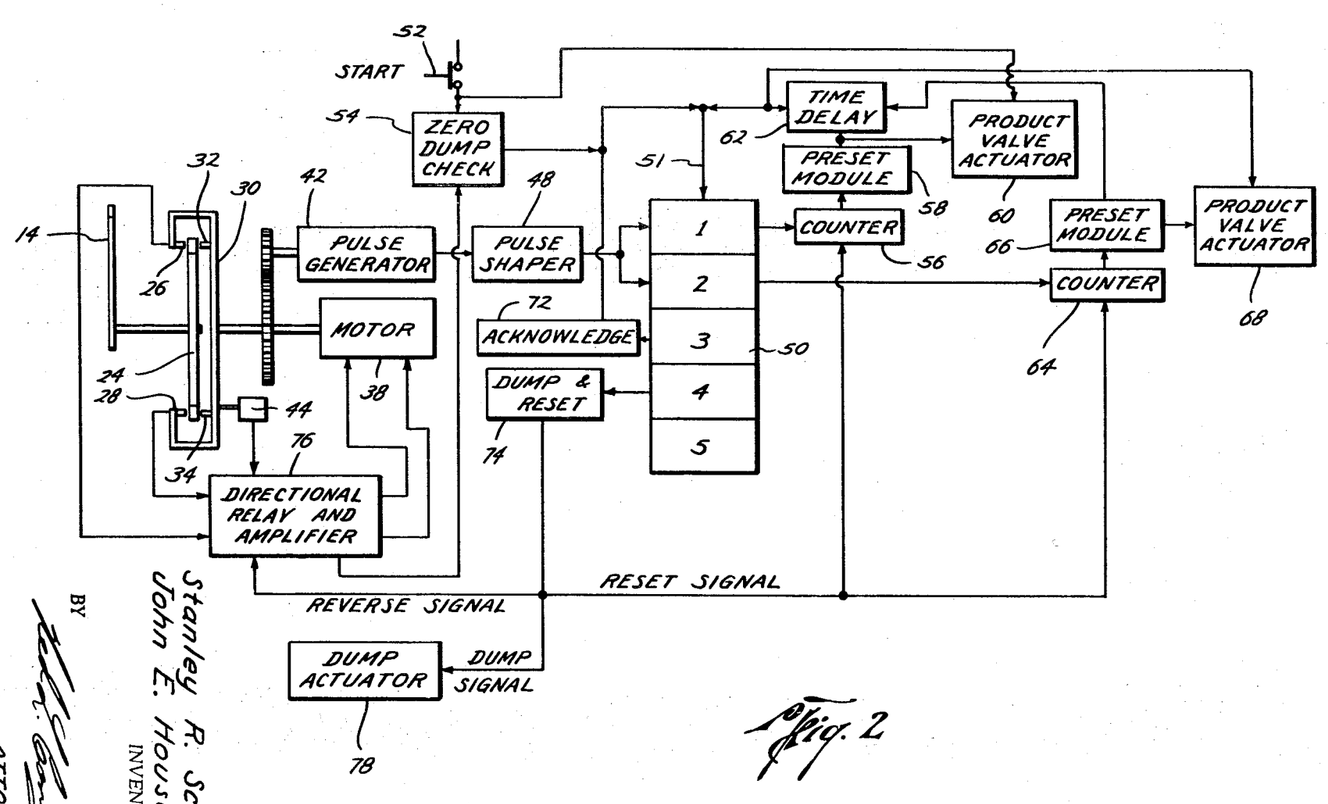
FIG. 2 is a schematic diagram showing the arrangement and connection of compounds of one embodiment of a system according to this invention.

For an example of a system suitable for such batch preparation, a reference is now made to FIG. 2 of the drawing, wherein a system for feeding two ingredients to a batch is disclosed.

The elements of the structure shown in FIG. 1 are shown more schematically in FIG. 2 together with accompanying components suitable for practice of the process of this invention and comprising a preferred embodiment of the system of this invention. As seen in FIG. 2, a directional relay and amplifier 76 is provided and is connected to the photosensitive devices 26 and 28, the microswitch 44 and the motor 38. The purpose of this relay 76 is to receive signals from various sources to energize one or the other of the sensors 26 and 28, to energize and deenergize the motor clutch and brake, and to feed operating current to the motor 38 to turn it either in a forward direction or a reverse direction, depending on whether the scale is being filled or emptied. In the following discussion the forward direction of the motor will be considered to be that direction which the motor must turn in order to cause the follower arm to follow the shadow disk during the time the scale platform is being loaded, and the reverse direction of the motor shall be considered to be that direction of the motor as is required to rotate the follower arm in a direction to follow the shadow disk during the time the scale platform is being unloaded.

It will be appreciated that the element 76 may comprise a number of relays together with amplifiers as required to provide the operation hereinbefore described. Nevertheless, the construction of such electrical components and their operation are conventional and well known in the art and therefore need not be described herein in detail.

The pulses generated by the pulse generator 42 are shaped at the pulse shaper 48, which may, for example, be a Durant pulse shaper, Cat. No. 50031–200, manufactured by Durant Manufacturing Co., Milwaukee, Wis. The shaped pulses are fed to a stepping switch 50, which, in the embodiment shown, has five steps and is operated by signals received from various components of the system as through the stepping signal conduit 51. Such stepping switches are well known in the art and need not be further described herein. At the first step of the stepping switch the shaped pulses are fed to a pulse counter 56, of a type well known in the art. The counter may, for example, be of the type which displays a visual number indicating the accumulated number of pulses which have been fed to the counter. The pulse counter 56 is connected to a preset module 58 which may, for example, be of the type manufactured by Chicago Dynamic Industries, Inc., of Chicago, Ill., and which they describe as their Preset No. PB–DN–10. The preset module may be preset with a desired number of indicating the quantity of the first material which it is desired to feed to the scale platform. The preset module is capable of comparing its preset number with the number of pulses recorded on counter 56 and producing a signal when these numbers coincide.

The operation of a cycle on the equipment of this invention may be started by means of a switch 52. The switch 52 may be operated manually or may be operated automatically at the end of a preceding cycle. The switch 52, in the embodiment shown, provides a signal through the zero dump check 54 (hereinafter described) and conduit 51, which moves the stepping switch to step 1. The operatiion of switch 52 also sends a signal to the product valve actuator 60 to open the valve so that the first ingredient to be measured begins to be delivered to the scale platform.

As previously described, the feeding of material to the scale platform results in the generation of pulses in proportion to the amount of material. When the pulse count on the counter 56 coincides with the preset amount on the preset module 58 a signal is generated and fed to the product valve actuator to cause the valve delivering the first ingredient to close. At the same time a signal is fed to a suitable time delay 62, and from the time delay a suitable stepping signal is fed to the stepping switch to move to step 2 of the stepping switch. After the time delay a signal is also sent to the product valve actuator 68 which controls the valve to deliver the second ingredient to the scale platform.

The time delay device can be any of a number of delay devices known in the art and may be preset to a time found by experimentation to be suitable to allow all of the material falling from the product valve to fall onto the scale platform. Alternatively the time delay means may be a device which is set to hold the output signal until the pulse generator has completely stopped, thus indicating that all of the material has fallen onto the scale platform. In any event the purpose of this element is to insure that all of the material has been measured by the counter 56 before the pulses from the pulse generator are switched from this counter to the next counter in step 2.

In step 2 the pulses are fed to the counter 64 and compared with the preset amount on preset module 66. When these amounts coincide the product valve actuator 68 receives a signal to close the valve controlling the flow of the second ingredient and also a signal is sent through the time delay 62 back to the stepping switch.

At this point the stepping switch goes to step 3, which is a Hold and Acknowledge step. The principal purpose of this step is for the operator to determine how much material has been delivered to the scale platform. This may be done by a visual examination of the readings on the counters 56 and 64, or may be done by an automatic printing of these amounts. When the operation is visual the acknowledgment may be by means of pushing the button in the Acknowledge circuit 72, or when the step is an automatic one of the acknowldgement may come automatically after the printing or other step has taken place. At any rate the Acknowledge circuit produces a further signal which returns through conduit 51 to the stepping switch to step up to the fourth step.

The fourth step of the system is a dump and reset step at which the material which has been delivered to the scale platform is dumped from the scale platform and the counters are reset to zero. Thus, moving the stepping switch to the fourth step closes a dump and reset relay 74 which provides a dump signal to dump actuator 78 and a reset signal to the counters 56 and 64 to reset them to zero. This circuit also provides a reverse signal to the directional relay and amplifier 76. It will be appreciated that when the material is dumped from the scale platform the scale pointer 14 will move in the down direction carrying the shadow disk 24 with it. Thus, in order for the follower arm 30 to follow the shadow disk it is necessary that the motor 38 be run in the reverse direction. The reverse signal thus energizes the down sensor 28 and deenergizes the up sensor 26 and reverses the motor 38 so that the follower arm 30 follows the shadow disk down. When the pointer 14 reaches zero the follower arm continues a short distance, as has previously been described, to contact the microswitch 44, which provides another signal to the directional relay 76 to deenergize sensor 28 and energize sensor 26, and reverse motor 38 again to operate in the up direction. The motor moves in the up direction only a very short distance. The shadow disk is sitting at zero and therefore as soon as the follower arm carries the sensor 26 to zero so that the sensor is hidden from the light 32, the motor clutch is deenergized and the follower arm stops.

The operation of the microswitch 44 also provides a signal to the zero dump check 54 to indicate that all product has been dumped from the scale platform and that the system is ready to start another cycle. A stepping signal to the stepping switch moves it to step 5, or home position, ready to start a new cycle.

It will be appreciated that the process of this invention as performed by the system disclosed in FIG. 2 is initiated by the start or fill switch 52 which, by means of a signal to product valve actuator 60, causes the first ingredient valve to open so that the ingredient begins to flow to the scale platform. The flow of material to the platform causes the scale pointer 14 to move up, thereby rotating the shadow disk 24 in an up direction. At the beginning of the process the system is already set in a start condition so that sensor 26 is energized and sensor 28 is not, and motor 38 is turning in the "up" direction. Thus, as soon as the shadow disk starts moving to expose sensor disk 26 to the light from 32, an output signal engages the motor clutch, causing the follower arm 30 to follow the shadow disk. Throughout the movement of the follower arm from its reference position to its final position, the pulse generator generates pulses proportional to the movement of the follower arm, and therefore proportional to the amount of material being fed to the scale platform, since the mechanism is completely linear. Pulses generated are shaped and fed first to coutner 56, where the pulses are counted and compared to the amount preset on the preset module 58. It will be appreciated that the preset module will be set with a figure corresponding to the amount of the first ingredient which it is desired to put into the batch. It will also be understood that the flow of the types of materials which are handled in systems such as that in the present invention cannot be initiated or terminated instantly and that material which is in free fall, for example, when the valve is closed, will continue to be added to the scale platform. Thus, if it is desired to put, for example, 250 pounds of the first ingredient on the platform it may be necessary to set the preset module at, for example, 245 pounds. Such amounts can be obtained by experience so as to decrease the error from the desired amount to be delivered. At any rate, any error is certain to be on the plus side, since the signal to close the valve is not created until the count on the counter equals the amount present on the preset module. Afer the generation of this signal to close the valve, it is obvious that pulses will continue to flow to the counter, and that the counter will continue to count, for the reason that material in free fall is still falling on the scale platform and the follower arm 30 is still following the shadow disk. For this reason a time delay 62 is provided to insure that all of this material falls on the platform before the system goes to the next step.

The next step is initiated by the signal from the time delay which operates the stepping switch to step 2, and which also sends a signal to open the valve for the second ingredient. The system operates in the same way for the second ingredient as for the first. Furthermore, as many ingredients as desired may be added by simply adding additional steps and counting systems at this point.

An important feature of the invention is that it is not necessary to reset the scale to zero or to make any change whatsoever at the scale head or in the monitoring apparatus before the addition of a second material. Thus, if the scale already has on it 250 pounds of the first ingredient, the operation may continue from that point. The only setting necessary is the initial setting of the preset modules, and no resetting is required anywhere in the cycle until the batch is completed.

As previously described, following the delivery of the second ingredient to the scale platform, the amounts registered on the counters may be noted or printed and an acknowledgment signal sent to the stepping switch to move to the dump and reset step of the cycle. At this point the counters are reset to zero, the material is dumped from the scale platform, and the sensor 28 is energized and sensor 26 deenergized and the motor 38 is reversed to cause the follower arm 30 to follow the shadow disk down to zero.

The accuracy of the measuring system of this invention is absolute, since the pulses are generated and counted directly from the movement of the scale itself. All slack is taken out of the mechanical apparatus by the moving of the follower arm past zero and then back up to zero prior to beginning each cycle. This feature also eliminates any possible error due to differentials between photosensitive devices.

In the apparatus of this invention, any number of ingredients can be measured together in the same batch without resetting the equipment between ingredients, it only being necessary that a separate counter circuit be provided for each ingredient. Full scale accuracy is achieved on each ingredient in the batch with no carry over of error from ingredient to ingredient. Because of the inherent similarity in the amount of free fall of various materials, uniformity from batch to batch can be maintained exceedingly accurately.

Another advantage of the system of the present invention is increased accuracy due to compensation for inertia effects in the scale. Such inertia is due to friction of support pins, cells or pivots that support a scale platform and other elements within the scale. Thus, when a small amount of product is fed onto a scale platform the scale pointer does not move at first. After some additional amount has fallen enough weight is reached to cause the scale to surge ahead, even going beyond the actual weight then on the platform and settling back to the actual weight. This continues, in any weighing system, in very small increments throughout the weighing cycle. Heretofore previous systems have had to accept such surging as error and provide elaborate controls to read out accurately what the scale weighed, and the final weight could be either over or under the desired weight. However, with the process and apparatus of this invention it is not possible to be under weight. Instead, any error will be over the desired weight. This is due to the fact that the motion of the follower arm is coordinated with rate of flow of material so that it moves slower than the forward surge of the pointer, and faster than the means speed of the pointer. The motion of the follower arm will allow time for the recording device to move up one "inertia effect" cycle, be stabilized and then be checked. The follower arm is being continuously monitored and the exact reading of the follower arm is recorded.

Figure 3:
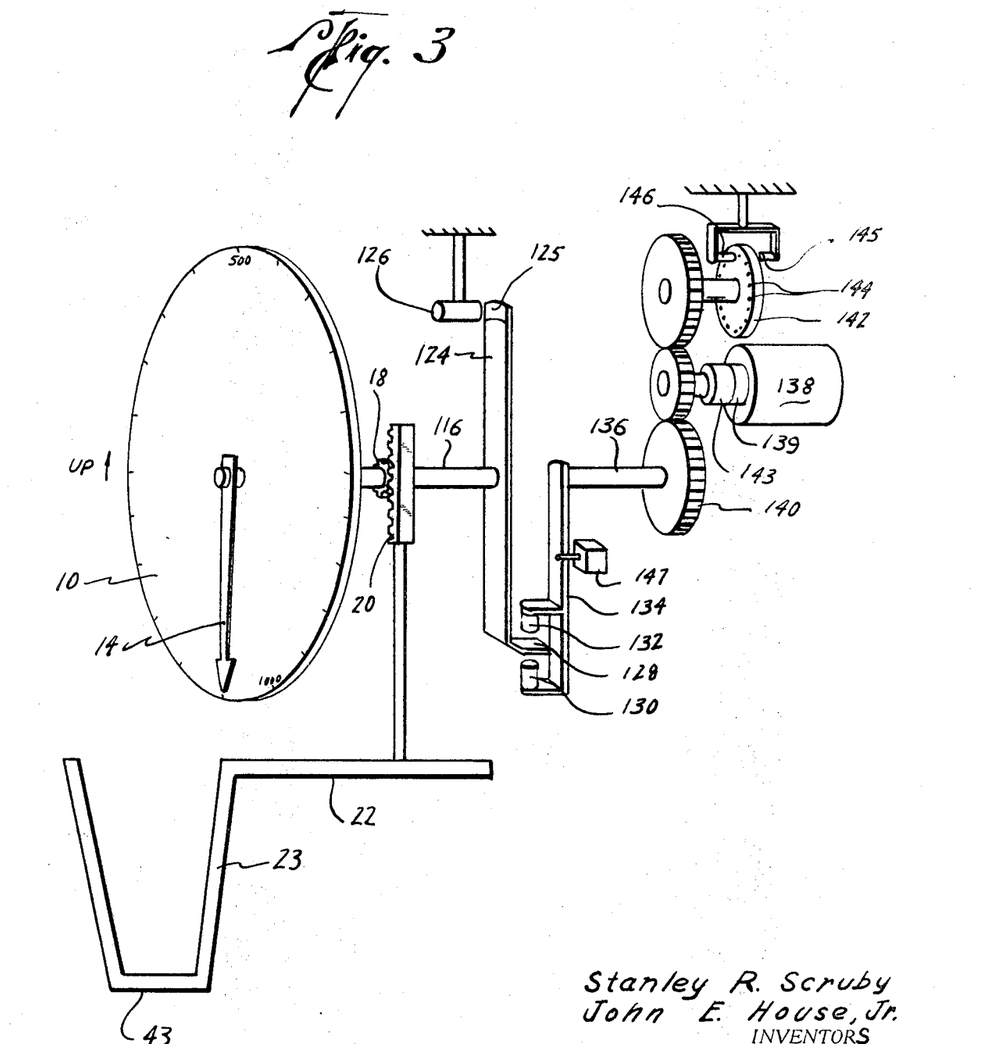
FIG. 3 is a somewhat schematic perspective view of another embodiment of the mechanical apparatus.

In the embodiment of the invention shown in FIG. 3, an arm 124 is mounted on the rear end of the shaft 16 for rotation therewith. One end of the arm 124 is provided with a mirrored surface 125 positioned for impingement of a beam of light from a zero sensor 126. The zero sensor may comprise a light and a photocell (duodiode) mounted side by side so that a reflection of the light from the mirrored surface 125 will impinge upon the photocell and create a signal.

The other end of the arm 124 is provided with a shadow flag 128 which is positioned to pass between a light source 130 and a photocell 132 which are mounted upon a follower arm 134. Follower arm 134 is mounted on a shaft 136 for rotation therewith. Shaft 36 is axially aligned with shaft 16 and is driven by a reversible motor 138 through a gear train 140, similarly as described for the previous embodiment. For clarity, in this embodiment the brake 143 and clutch 139 are shown on the motor shaft.

The motor also drives a shadow disk 142 which functions as a pulse generator. The shadow disk 142 is provided with a plurality of apertures 44 extending therethrough and evenly spaced around the circumference of the disk. A light source 145 and a photocell 146 are positioned on opposite sides of the shadow disk so that a signal pulse is generated every time one of the apertures 144 comes between the light and the photocell. Since the shadow disk is connected by the gear train 140 directly to the follower arm 134, the movement of the shadow disk is always proportional to the movement of the follower arm and the number of pulses generated are in direct proportion to the angle of motion of the follower arm. The gear ratios and the number of apertures 144 can readily be selected so that one or more pulses are generated whenever the follower arm moves an amount equal to one weight unit. Thus, for example, if it is desired to give the weight of material in a number accurate to one pound, the gear ratio and aperture spacing may be selected so that a pulse is generated every time one pound is added to the scale.

The sensor 132 is connected through a switching circuit (to be hereinafter described) in such a way that upon energization of the sensor the motor brake will be disengaged and the clutch engaged, so that the motor can drive the follower arm 134 cockwise (as viewed in FIG. 1), and when the device is deenergized brake is engaged and the clutch disengaged so that the follower arm stops. Thus, when the material is being loaded onto the scale platform, the pointer 14 and the arm 124 will rotate clockwise, or in the "up" direction so as to move the flag 128 from between the light source 130 and the sensor 132. This will cause the motor to drive the follower arm clockwise, as seen in FIG. 3, so as to tend to catch up with the flag 128. So long as the sensor does not catch up with the flag, it is receiving light and is thereby sensitized so as to cause the shaft 136 to continue to rotate. However, the follower arm moves faster than the flow of material onto the scale causes the flag to move, so the sensor periodically catches up with the flag and becomes hidden from the light source 130. The resulting cessation of the signal from the sensor will cause the circuit to engage the brake and disconnect the clutch so that the shaft 136 stops turning. If material is still being fed onto the scale platform, the flag will again move from between the light 130 and the sensor 132 so that the brake will be disengaged and the clutch will be engaged again.

The pulse generator 142 generates pulses in proportion to the motion of the follower arm, and, as in the previous embodiment, these are counted to indicate the weight of material on the scale platform at any particular time.

When a desired amount of material has been fed to the scale platform, the flow of material is stopped. After a brief time delay, the motor is reversed to return the follower arm until it contacts a lower limit swich 147 somewhat beyond scale zero. A signal from the limit switch engages the brake and stops the follower arm. The hopper is then emptied by opening a door through the bottom 43 thereof, causing the scale pointer 14 to return to scale zero.

Upon the return of the pointer to scale zero, a reversing signal starts the motor 38 to operating in a forward direction to bring the follower arm up to the point where the flag 28 hides the sensor 32. This motion compensates for whatever tare weight is on the scale. Pulses are generated during this motion, but they are not counted. When the follower reaches the tare weight it stops and the pulse generation stops. The scale is then ready to be used for weighing another batch.

Figure 4:
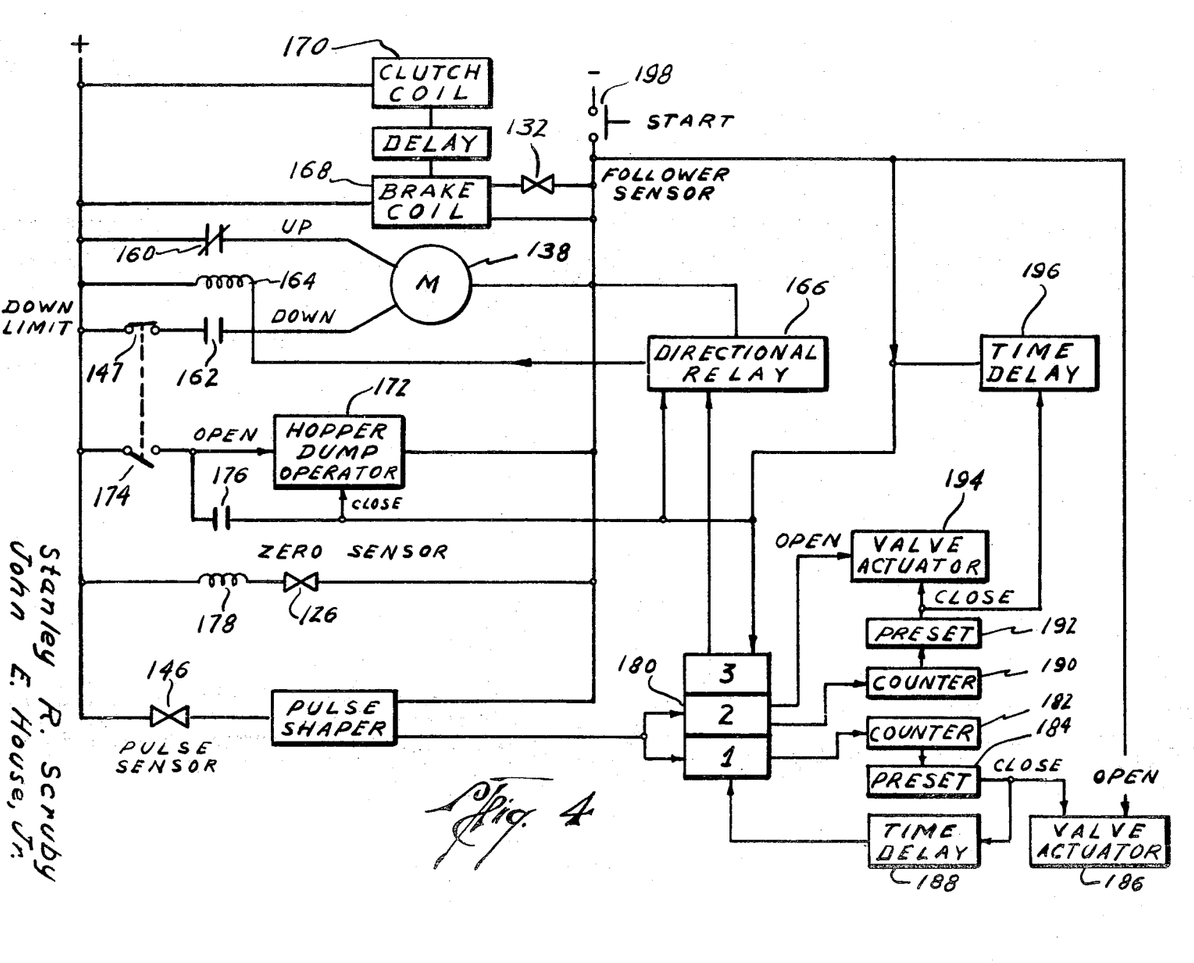
FIG. 4 is a schematic diagram of another embodiment of a system according to this invention.

In the system shown in FIG. 4 the motor 138 may be alternately connected for upward movement through the circuit including the relay 160 and for downward movement through the circuit including the relay 162. The circuit including the relay 162 also includes the limit switch 147 previously referred to. The relays 160 and 162 are actuated by a holding coil 164 which receives its current from directional relay 166. The directional relay may comprise a number of relays or flip-flops together with amplifiers as required to perform the operations attributed to it herein. Such devices are well known in the art and need not be described in detail herein.

As previously described, the sensor 132 on the follower arm energizes and deenergizes the brake and clutch 143 and 139. As shown in FIG. 2, the sensor 132 provides a signal to the brake coil 168 to energize or deenergize his coil and, after a brief delay, to deenergize or energize, respectively, the clutch coil 170.

The system is provided with a hopper dump operator 172 adapted to be energized through a circuit containing a switch 174 which is mechanically connected to the limit switch 147, so that when the follower arm opens the limit switch 147 the switch 174 is closed to dump material from the hopper. The hopper is closed by a signal which goes through a relay 176. Relay 176 is energized by holding coil 178 which is in a circuit with the zero sensor 126 previously described.

Pulses generated in the sensor 146 are fed to a pulse shaper 178. The shaped pulses are fed to a pulse counter, being directed to the proper counter by a stepping switch 180 which, in the embodiment shown, has three steps and is operated by signals received from various components of the system. At the first step of the stepping switch the shaped pulses are fed to a pulse counter 182. The pulse counter 182 is connected to a preset module 184, which may be preset with a desired number indicating the quantity of the first material which it is desired to feed to the scale platform. A valve actuator 186, which controls the valve through which the first ingredient is delivered to the scale platform, is connected to receive a signal from the preset module when the pulses counted by the pulse counter equal the preset number so as to close the valve and stop the flow of material to the scale platform. This signal is also fed to a time delay device 188 which in turn feeds a delayed signal to the stepping switch to cause it to step to the second step so that shaped pulses are fed to a second counter 190. This counter cooperates with preset 192 and valve actuator 194 to control the amount of a second ingredient fed to the scale platform. Another time delay 196 is provided between the preset 192 and the stepping switch to allow all material in free fall to fall to the scale platform before moving to the next step.

When this system is to be operated, the presets are set to the desired amount of each ingredient to be delivered to the scale platform. Then, upon the closing of a start switch 198, a signal is received by the stepping switch to move it to the first step, and the first valve actuator 186 is operated to open the valve for the first ingredient. At his point the up coil of motor 138 is energized so that the motor is rotating in a direction to cause the follower arm 124 to follow the scale pointer as it moves upwardly. As soon as the scale begins to move, due to the feeding of material onto the scale platform, the flag 128 moves from between the light 130 and the sensor 132 so that a signal is fed to the brake coil 168 of the motor 138. The brake is thereby released and the clutch engaged so that the motor begins ot move the follower arm 134. At the same time, the motor moves the shadow disk 142 so that electrical pulses are generated by the sensor 146. These pulses are shaped in the pulse shaper 178 and fed to counter 82. The motor is moving the follower arm faster than the rate of motion of the arm 124 on the scale so that periodically the follower arm catches up with the arm 124. The sensor 132 is thereby deenergized by the flag 128 being placed between it and the light 130, and this results in a signal to the brake coil and to the clutch coil to stop the rotation of shaft 136 and of shadow disk 142. Thus, no pulses are generated during this period. The further loading of the scale, however, moves the flag 128 from between the light 130 and the sensor 132 so that the follower arm begins to move again.

When the pulse count on the counter 182 coincides with the preset amount on the preset module 184, a signal is generated and fed to the product valve actuator to cause the valve delivering the first ingredient to close. At the same time, a signal is fed to a suitable time delay 188, and after a time delay sufficient for all free fall material to fall to the scale platform a suitable stepping signal is fed to the stepping switch to move to step 2.

Upon moving to step 2 the stepping switch signals the valve actuator 194 for the second ingredient valve to open and connects the pulse shaper with counter 190 so that pulses from the pulse shaper are fed to this counter. The pulses counted in counter 190 are compared with the preset amount on preset module 192, and when these amounts coincide the product valve actuator 194 receive a signal to close the valve controlling the flow of the second ingredient. In addition, a signal is sent through a time delay 196 back to the stepping switch to cause it to move to the third step.

Again, the time delay is such as to insure that all of the material in free fall is received on the scale platform and measured before the system goes to the next step.

When the delayed signal actuates the stepping switch, a signal is fed back to the directional relay 166 to energize coil 164 and reverse the direction of the motor 138, thereby bringing the follower arm back down.

When the follower arm has been returned all the way down to contact the downward limit switch 147 it opens this switch and thereby opens the circuit to the motor and stops the motor. This limit switch is mechanically connected to a switch 174 which is closed at the same time the limit switch is open so as to cause the hopper dump operator 172 to dump the material from the hopper. As the material is being dumped from the hopper the scale pointer returns toward zero and the arm 124 on the scale also moves toward zero. The zero sensor 126 signals when the scale is down to scale zero by reflection of light from the mirrored surface 125 on the arm 124. This signal enerzizes a coil 178 to close a relay 176 which gives a signal to the hopper dump operator to close the hopper, and at the same time sends a signal to the directional relay 166 to reverse the direction of the motor 138 so that the motor will begin to operate in an upward direction, thereby bringing the follower arm up until the flag 128 hides the sensor 132 so as to energize the brake 168 and deenergizes the clutch 170. There is no connection with any pulse counter, therefore pulses generated during this movement are not counted.

The system is now in condition to start a new cycle.

It is therefore apparent that a system has been provided which is capable of measuring a plurality of ingredients in a batch with great accuracy, compensating for any variation in tare weight between various batches, and making the accuracy of weight of each ingredient completely independent of the amount of each other ingredient fed to the scale. The system also provides apparatus to control the flow of materials to the scale while measuring the amount of material at the same time so that no separate operation is required for measurement. This greatly speeds up the weighing of the materials.

Furthermore, the accuracy of the amount of the first ingredient is completely independent of any variation in tare weight, since the system automatically compensates for any tare weight on the scale before the first valve is opened to feed the first ingredient to the scale. The measuring system measures only the angle of movement of the scale pointer during the time the material is being fed to the scale.

It will be apparent that various components described in the preferred embodiment herein may be replaced by equivalent components known in the art without departing from the scope of this invention. For example, transistors and flipflops may be used in place of the various relays and switches described herein.

It will also be apparent that the present invention may be utilized to control and measure preset amounts of materials being removed from a scale by merely reversing the operation of the follower arm and using the preset signal to actuate the hopper dump operator.

The system described in readily adaptable for use with punched card or tape programming, for remote printing of weights with time and data entries, and remote totalizers as required to provide for a completely automatic system. Various signaling devices may be incorporated in the system to notify the operator of the completion of one operation and the beginning of another, and safety devices may be incorporated to prevent continuation of the cycle when an error has been made. Thus, for example, an upper limit switch similar to the lower limit switch 147 may be provided to prevent the scale overrunning its limit. Means may also be incorporated to indicate that an overrun of a single ingredient beyond a selected tolerance range.

Various embodiments of the invention are shown in the drawing and described in the specification, but many variations thereof will be apparent to those skilled in the art. It is not practical to show or describe all the variations included within the invention, and therefore the embodiments described should be considered illustrative only, and not limiting, the scope of the invention being as broad as is defined by the appended claims. The form of the claims and the specification, including the Abstract, is adopted solely for easier reading and understanding, and should not be considered in interpreting the scope of the invention claimed.

What is claimed is:

1. The method of measuring delivery of material to a given location comprising:

a cumulatively measuring the quantity of material actually delivered and moving an indicator member along a predetermined path in accordance with such measurement, moving a follower member in response to movement of said indicator member an amount proportional to the movement of the indicator member, interrupting delivery of material to said location when said follower member has moved an amount representative of a preselected quantity of material to be delivered, and measuring the total movement of said follower member to accurately determine the amount of material delivered.

2. Apparatus comprising:

control means for controlling the change in a variable, indicator means movable in response to such change from a reference position along a predetermined path in an amount proportional to the amount of change for cumulatively indicating the change in said variable, follower means movable proportionately to said indicator means, means operatively connected to said follower means, means operatively connected to said follower means responsive to movement of said indicator means to cause movement of said follower means, for measuring its movement, and means connected to said control means and said measuring means for stopping the change in the variable upon measurement by the measuring means of a predetermined cumulative variation.

3. A system for controlling and measuring the weight of material delivered to a given location comprising:

a scale platform, valve means for allowing and preventing flow of material to said scale platform, an indicator member operably connected to said scale platform and movable from a reference position along a predetermined path in response to delivery of material to said scale platform to cumulatively indicate the weight of material thereon, a follower member movable from said reference position along said path, a power source operatively connected to said follower member for moving it along said path, said power source having a velocity such that it moves the follower member faster than said indicator member, a pulse generator driven by said power source, cooperating means on said indicator member and said follower member and operably connected to said power source adapted to cause operation of said power source so long as said indicator member lends said follower member, a pulse counter connected to count the pulses of said pulse generator, and a presetting mechanism, including
  a comparator, connected to said counter and to said valve means, adapted to be preset to a predetermined number of pulses and to provide a closing signal to said valve means when said predetermined number has been counted.

4. A system as defined by claim 3, wherein said cooperating means comprises:

a photosensitive device on said follower member adapted to produce a signal, upon change of said photosensitive device from one state to another state, which results in operation of said power source, and adapted to produce another signal, upon change from said other state to said one state, which results in cessation of operation of said power source, a light source positioned to activate said photosensitive device, and means on said indicator means positioned to selectively cover and uncover said photosensitive device upon movement of said indicator means with respect to said follower means to cause changes of state of said photosensitive device, whereby said pulse generator is caused to generate pulses only so long as said indicator member is further along said path than said follower member.

5. A weighting system comprising:

a scale, an element on said scale movable upwardly in response to increases in the weight of material on sain scale, a sensor adapted to follow said element, power means driving said sensor at a velocity greater than the velocity of said element, means operably engaging said sensor and said power means adapted to stop the movement of said sensor when it catches up with said element and to start it to moving when its falls behind, means responsively associated with said sensor for generating a signal in response to the movement of said sensor, said signal being proportional to said movement, means operatively connected to said generating means for measuring said signal as an indication of the weight of material on said scale, a preset device for presetting a desired weight of material to be delivered to said scale, valve means operable to cause material to be weighed to be deposited on said scale, and means operatively connected to said valve means, said measuring means, and said preset means, and responsive to the coincidence of the indication of said measuring means and the preset desired weight to operate said valve means to stop the deposite of material on said scale.

6. A weighing system as defined by claim 5 wherein said power means is reversible, and including
  means connected to said power means for selectively reversing it and driving said sensor downwardly, and
  switch means, actuatable in response to movement of said sensor to a position below the lowest possible position of said element, to cause said power means to drive said sensor upwardly.

7. A weighing system as defined by claim 5 and including:

switching means connected to disengage said measuring means when the sensor is moving while the weight of material on said scale is not being changed.

8. A weighing system as defined by claim 7 wherein said power means is reversible, and including
  means connected to said power means for selectively reversing it and driving said sensor downwardly, and
  switch means, actuable in response to movement to said sensor to a position below the lowest possible position of said element, to cause said power means to drive said sensor upwardly.

9. A system for measuring delivery of material to a given location comprising:

material delivery means, including arresting means for arresting the delivery of material, means for cumulatively measuring
  the quantity of material delivered, including an indicator member movable in direct response to the material delivery from a reference position along a predetermined path, in an amount proportional to the amount of material delivered, a follower member movable from said reference position along said path, a power source operatively connected to said follower member for moving it along said path, means for actuating said power source in response to movement of said indicator member ahead of said follower member, whereby said follower member is moved an amount proportional to the movement of said indicator member, means operably engaging said arresting means and said follower member to actuate said arresting means to arrest delivery of material to said location when said follower member has moved an amount representative of a preselected quantity of material to be delivered, and means operably engaging said follower member adapted to measure the total movement of said follower member to accurately determine the amount of material delievred.

10. A system as defined by claim 9 and including means operably engaging said power source for reversing its direction, whereby the follower member may be moved in the opposite direction in response to movement of said indicator member toward said reference position.

11. A system as defined by claim 10 wherein said power source drives a pulse generator proportionally to the driving of said follower member, and said means for measuring the total movement of said follower member comprises a pulse counter, and including cooperative means on said indicator member and said follower member adapted to cause operation of said power source so long as said indicator member leads said follower member.

12. A system as defined by claim 9 wherein said power source drives a pulse generator proportionally to the driving of said follower member, and said means for measuring the total movement of said follower member comprises a pulse counter.

13. A system as defined by claim 12 and including cooperating means on said indicator member and said follower member adapted to cause operation of said power source so long as said indicator means leads said follower member, said power source having a velocity such that it moves said follower member faster than said indicator member.

14. A system as defined by claim 13 wherein said cooperating means comprises:

a light shielding member attached to said indicator member, a light and a photosensitive device attached to said follower member, means on said light shielding member adapted to be moved to between and from between said light and said photo-sensitive member upon relative movement of said indicator member and said follower member.

15. A weighing system comprising:

a scale, an element on said scale movable in response to a change in the weight on said scale, a sensor adapted to follow said element when it moves in one direction and to stop when it catches the element, power means operatively connected to said sensor, said power means being adapted to move the sensor in the opposite direction past the farthest position to which said element can be moved, measuring means operatively connected to said sensor adapted to indicate a change in weight on said scale in response to movement of said sensor in said one direction, and switching means connected to disengage said measuring means when the sensor is moving and the weight on the scale is not being changed.

16. Apparatus as defined by claim 15 and including means operable in response to changes in the relative positions of said sensor and said element to stop the movement of said sensor in said one direction when it catches the element and to start it to moving when it falls behind.

17. Apparatus as defined by claim 15 and including means maintaining a continuous, uninterrupted change in weight on the scale from the time the change begins until after the desired change is achieved.

18. Apparatus as defined by claim 17 and including means operable in response to changes in the relative positions of said sensor and said element to stop the movement of said sensor in said one direction when it catches the element and to start it to moving when it falls behind.

19. Apparatus as defined by claim 15 and including a preset device connected to said measuring means for presetting a desired change in the weight of material on the scale, and means operatively engaging said preset device and said measuring means adapted to stop the change in the weight of the material on the scale in response to caincidence of the weight change indicated by the measuring means and the preset desired change.

20. Apparatus as defined by claim 19 and including means maintaining a continuous, uninterrupted change in weight on the scale from the time the change begins until after the desired change is achieved.

21. Apparatus as defined by claim 19 and including means operable in response to changes in the relative positions of said sensor and said element to stop the movement of said sensor in said one direction when it catches the element and to start it to moving when it falls behind.

22. Apparatus comprising a scale, an element on said scale movable in response to a change in the weight of material on the scale from an initial position to a final position at a speed proportional to the rate of change in said weight, a sensor adapted to follow said element at a speed faster than the speed of the element, power means for driving said sensor, means to stop the movement of said sensor when it catches up with said element and to start it to moving when it falls behind, means for measuring the movement of said sensor and indicating the change in the weight of material on the scale as a function of said movement, a preset device for presetting a desired change in the weight of material on the scale, and means for stopping the change in weight of the material on said scale when the amount as measured from the movement of the sensor equals the preset amount.

23. Apparatus as defined by claim 22 wherein said power means is reversible, and including means connected to said power means for selectively reversing it and driving said sensor in a direction opposite its following movement, and switch means, actuable in response to said reverse movement of said sensor to a position beyond the initial position of said element, to cause said power means to drive said sensor in the following direction.

24. Apparatus as defined by claim 22 and including switching means connected to disengage said measuring means when the sensor is moving while the weight of material on said scale is not being changed.

25. Apparatus as defined by claim 24 wherein said power means is reversible, and including means connected to said power means for selectively reversing it and driving said sensor in a direction opposite its following movement, and switch means, actuable in response to said reverse movement of said sensor to a position beyond the initial position of said element, to cause said power means to drive said sensor in the following direction.

26. Apparatus as defined by claim 22 and including means maintaining a continuous, uninterrupted change in weight on the scale from the time the change begins until after the desired change is achieved.

27. Apparatus as defined by claim 26 and including switching means connected to disengage said measuring means when the sensor is moving while the weight of material on said scale is not being changed.

28. Apparatus as defined by claim 26 wherein said power means is reversible, and including means connected to said power means for selectively reversing it and driving said sensor in a direction opposite its following movement, and switch means, actuable in response to said reverse movement of said sensor to a position beyond the initial position of said element, to cause said power means to drive said sensor in the following direction.

References Cited

UNITED STATES PATENTS

| | | |
|---|---|---|
| 2,046,005 | 6/1936 | Sprecker. |
| 2,793,000 | 5/1957 | Klein et al. _________ 177—70 |
| 2,925,983 | 2/1960 | Kannaway et al. |
| 2,926,010 | 2/1960 | Kannaway et al. |
| 3,118,068 | 1/1964 | Duchene et al. |
| 3,133,604 | 5/1964 | Gardner _________ 177—70 X |
| 3,167,139 | 1/1965 | Schellentrager ________ 177—70 |

RICHARD B. WILKINSON, Primary Examiner

G. H. MILLER, JR., Assistant Examiner

U.S. Cl. X.R.

177—70